United States Patent
Sawai et al.

(10) Patent No.: US 8,885,574 B2
(45) Date of Patent: Nov. 11, 2014

(54) COMMUNICATION CONTROL METHOD AND COMMUNICATION SYSTEM FOR STARTING SECONDARY USAGE OF AN ASSIGNED SPECTRUM

(75) Inventors: Ryo Sawai, Tokyo (JP); Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 12/685,444

(22) Filed: Jan. 11, 2010

(65) Prior Publication Data

US 2010/0202387 A1 Aug. 12, 2010

(30) Foreign Application Priority Data

Feb. 6, 2009 (JP) .................. 2009-026276

(51) Int. Cl.
*H04W 4/00* (2009.01)
*H04B 7/204* (2006.01)
*H04W 16/14* (2009.01)

(52) U.S. Cl.
CPC .................. *H04W 16/14* (2013.01)
USPC .......................... 370/329; 370/319

(58) Field of Classification Search
USPC .................. 370/329, 334, 339
See application file for complete search history.

(56) References Cited

U.S. PATENT DOCUMENTS

| | | |
|---|---|---|
| 2004/0047324 A1 | 3/2004 | Diener |
| 2006/0063543 A1 * | 3/2006 | Matoba et al. ............... 455/509 |
| 2008/0225789 A1 | 9/2008 | Kim et al. |
| 2008/0261639 A1 | 10/2008 | Sun et al. |

FOREIGN PATENT DOCUMENTS

| | | |
|---|---|---|
| EP | 1750466 A1 | 8/2005 |
| EP | 1944996 A2 | 1/2008 |
| JP | 2008-289056 | 11/2008 |
| WO | WO2008/039872 A2 | 4/2008 |
| WO | WO 2008/086243 A1 | 7/2008 |

OTHER PUBLICATIONS

IEEE 802.22 WRAN, http://www.archive.org/web/web.php, 2 pages (2008).
Second Report and Order and Memorandum Opinion and Order, FCC 08-260, pp. 1-130 (2008).
May 21, 2013, JP Communication Issued for Related JP Application No. 2010-001914.

(Continued)

*Primary Examiner* — Afshawn Towfighi
(74) *Attorney, Agent, or Firm* — Sherr & Jiang, PLLC

(57) ABSTRACT

There is provided a communication control method comprising the steps of: providing an instruction for determining availability of usage of a second communication service using a part or whole of a spectrum assigned to a first communication service from a first communication device to a second communication device; providing an instruction for sensing a communication environment from the second communication device to a communication device located nearby; transmitting sensed data obtained by sensing a communication environment from a third communication device located near the second communication device to the second communication device; determining availability of usage of the second communication service based on the sensed data by the second communication device; transmitting a determination result on availability of usage of the second communication service from the second communication device to the first communication device; and permitting usage of the second communication service in accordance with the determination result received from the second communication device by the first communication device.

15 Claims, 11 Drawing Sheets

(56) References Cited

OTHER PUBLICATIONS

Hiroshi Harada, Dynamic Spectrum Access Network Based on Architecture of Cognitive Wireless Clouds, IEICE Technical Report, Oct. 2008, pp. 173-180, Japan.

Mai Ohta, et al., Performance Evaluation of Simultaneous Cooperative Sensing Information Collection Method under Many Sensing Terminals, IEICE Technical Report, Oct. 2008, pp. 207-213, Japan.

Feb. 5, 2014, European Search Report for related EP application No. 10151387.7.

* cited by examiner

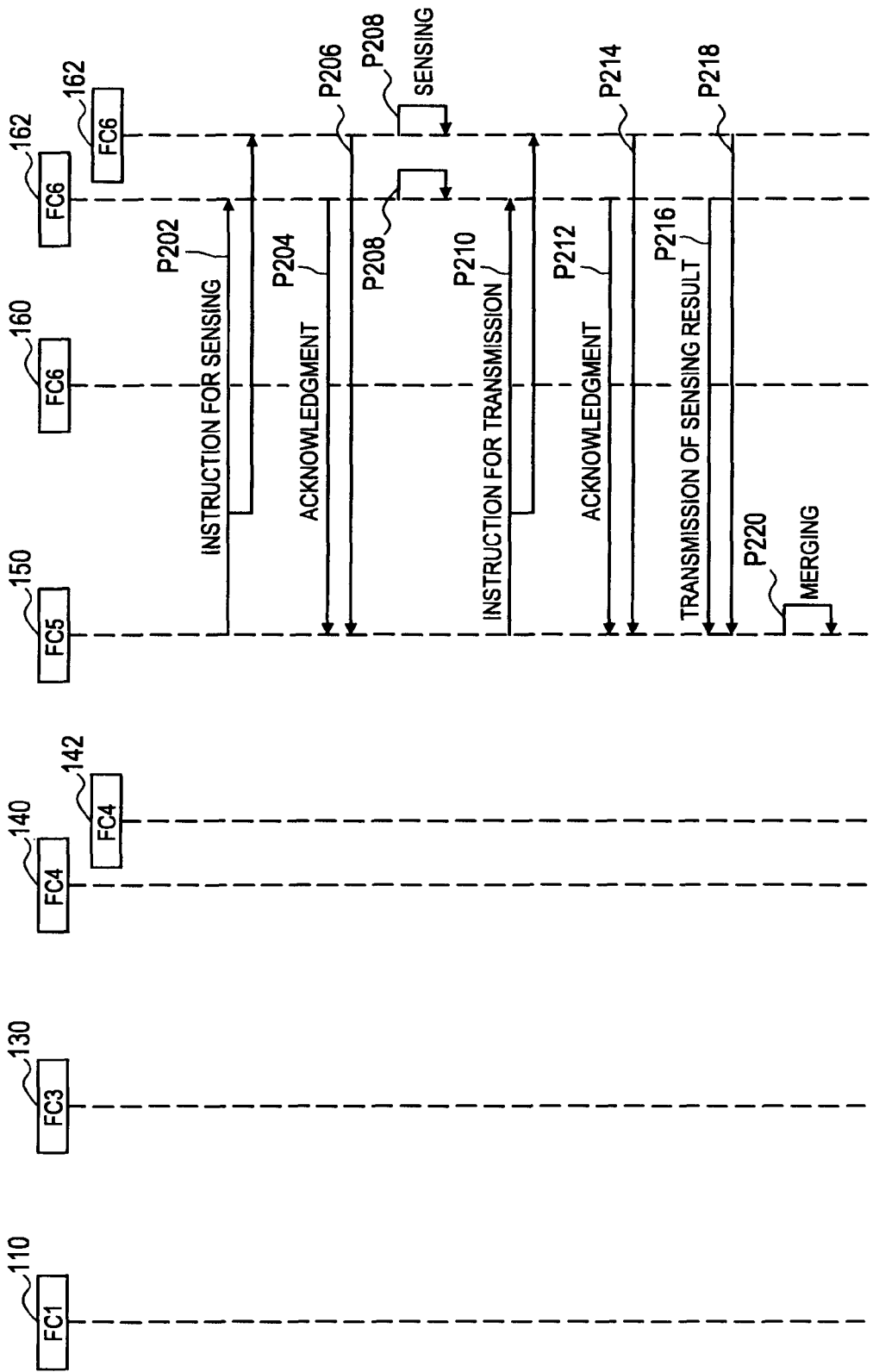

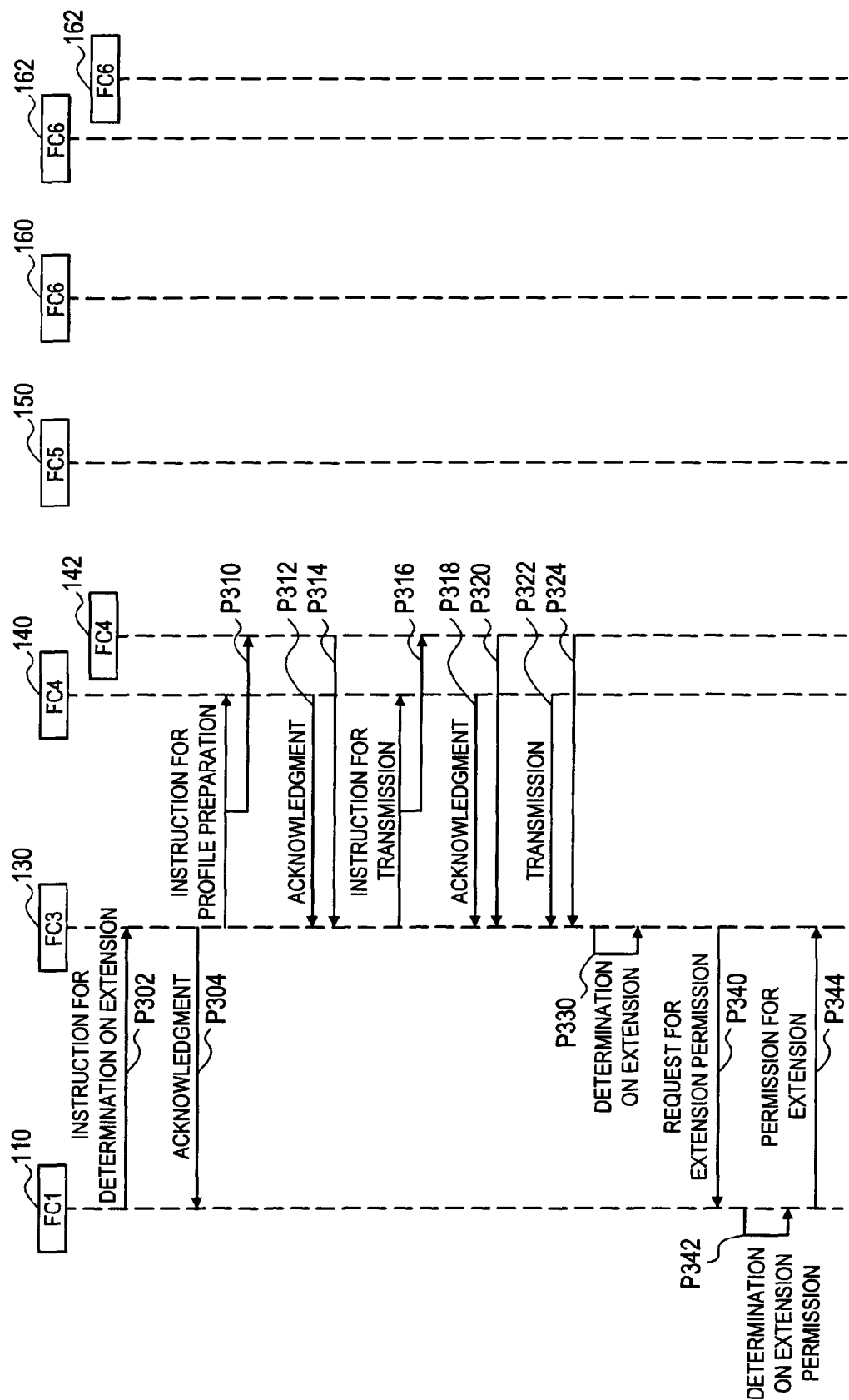

COMMUNICATION CONTROL METHOD AND COMMUNICATION SYSTEM FOR STARTING SECONDARY USAGE OF AN ASSIGNED SPECTRUM

BACKGROUND OF THE INVENTION

1. Field of the Invention

The present invention relates to a communication control method and a communication system.

2. Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group ("IEEE802.22 WG on WRANs", [online], [Searched on Jan. 5, 2009], cf. Internet <URL: http://www.ieee802.org/22/>). Further, according to the report from the Federal Communications Commission (FCC) on November 2008, the discussions are directed toward permitting secondary usage of TV white spaces by using specific communication devices that have been authorized by fulfilling a certain criterion ("Second Report and Order and Memorandum Opinion and Order", [online], [Searched on Jan. 5, 2009], cf. Internet <URL: http://hraunfoss.fcc.gov/edocs_public/attachmatch/FCC-08-260 µl.pdf>). In addition, there are moves, led by the EU, afoot to universally allocate a dedicated control channel called the cognitive pilot channel (CPC) for making dynamic spectrum access (DSA). Technological studies for a secondary usage system that makes DSA are also being progressed in IEEE Standards Coordinating Committee (SCC) 41. Further, as another example of secondary usage of a spectrum, there is a case where a secondary communication system is constructed using a simpler communication protocol in a service area of a majority system that uses a non-licensed spectrum. For example, it is assumed that when a WiFi (registered trademark) system that uses an Industry-Science-Medical (ISM) band is a majority system, a secondary communication system is constructed using another simple communication protocol in its service area.

At the time of secondary usage of a spectrum, it is necessary to sense the surrounding communication environment in advance and confirm that a communication service related to secondary usage (which is referred to hereinafter as a second communication service) does not cause an adverse effect on a communication service related to primary usage (which is referred to hereinafter as a first communication service).

SUMMARY OF THE INVENTION

However, in the implementation of a secondary usage system, no case has been reported which classifies functions to be incorporated into communication devices joining the system and presents a specific procedure that ensures secure start of secondary usage of a spectrum based on the classification.

In light of the foregoing, it is desirable to provide a novel and improved communication control method and communication system that enable secure start of secondary usage of a spectrum by cooperation of a plurality of communication devices.

According to an embodiment of the present invention, there is provided a communication control method comprising the steps of: providing an instruction for determining availability of usage of a second communication service using a part or whole of a spectrum assigned to a first communication service from a first communication device to a second communication device; providing an instruction for sensing a communication environment from the second communication device to a communication device located nearby; transmitting sensed data obtained by sensing a communication environment from a third communication device located near the second communication device to the second communication device; determining availability of usage of the second communication service based on the sensed data by the second communication device; transmitting a determination result on availability of usage of the second communication service from the second communication device to the first communication device; and permitting usage of the second communication service in accordance with the determination result received from the second communication device by the first communication device.

The communication control method may further comprise the step of: transmitting, after receiving the instruction for sensing a communication environment, a sensing instruction for sensing a communication environment from the third communication device to a communication device located nearby.

The communication control method may further comprise the step of: if a plurality of communication devices capable of sensing a communication environment exists near the second communication device, merging sensed data sensed by the plurality of communication devices by the third communication device being one of the plurality of communication devices.

The communication control method may further comprise the step of: if a plurality of communication devices capable of determining availability of usage of the second communication service exists, selecting a device to make determination on availability of usage of the second communication service from the plurality of communication devices by the first communication device.

The communication control method may further comprise the step of: upon receiving a request for extension of a network related to the second communication service after usage of the second communication service is permitted, providing an instruction for determining availability of extension of the network related to the second communication service from the first communication device to a fourth communication device.

The communication control method may further comprise the steps of: providing an instruction for transmitting profile data related to the second communication service from the fourth communication device to the second communication device; and transmitting the profile data from the second communication device to the fourth communication device.

The communication control method may further comprise the step of: determining availability of extension of the network related to the second communication service based on the profile data by the fourth communication device.

The communication control method may further comprise the step of: transmitting a determination result on availability of extension of the network related to the second communication service from the fourth communication device to the first communication device.

The communication control method may further comprise the step of: permitting extension of the network related to the second communication service in accordance with the determination result received from the fourth communication device by the first communication device.

According to another embodiment of the present invention, there is provided a communication control method comprising the steps of: upon receiving a request for extension of a network related to a second communication service using a part or whole of a spectrum assigned to a first communication service, providing an instruction for determining availability of extension of the network from a first communication device to a second communication device; providing an instruction for transmitting profile data related to the second communication service from the second communication device to a third communication device providing the second communication service; transmitting the profile data from the third communication device to the second communication device; determining availability of extension of the network related to the second communication service based on the profile data by the second communication device; transmitting a determination result on availability of extension of the network related to the second communication service from the second communication device to the first communication device; and permitting extension of the network related to the second communication service in accordance with the determination result received from the second communication device by the first communication device.

According to another embodiment of the present invention, there is provided a communication system comprising: a first communication device including an authentication unit having authority to permit usage of a second communication service using a part or whole of a spectrum assigned to a first communication service; a second communication device including a determination unit capable of determining availability of usage of the second communication service; and a third communication device including a sensing unit capable of sensing a surrounding communication environment, wherein the authentication unit provides an instruction for determining availability of usage of the second communication service to the second communication device and permits usage of the second communication service in accordance with a determination result on availability of usage of the second communication service, the determination result being received from the second communication device, and the determination unit provides an instruction for sensing a surrounding communication environment to the third communication device and determines availability of usage of the second communication service based on sensed data obtained by sensing a communication environment, the sensed data being received from the third communication device.

According to another embodiment of the present invention, there is provided a communication system comprising: a first communication device including an authentication unit having authority to permit extension of a network related to a second communication service using a part or whole of a spectrum assigned to a first communication service; a second communication device including an advanced determination unit capable of determining availability of extension of the network related to the second communication service; and a third communication device including a determination unit capable of determining availability of usage of the second communication service, wherein the authentication unit provides an instruction for determining availability of extension of the network related to the second communication service to the second communication device and permits extension of the network in accordance with a determination result on availability of extension of the network, the determination result being received from the second communication device, and the advanced determination unit provides an instruction for transmitting profile data related to the second communication service to the third communication device and determines availability of extension of the network related to the second communication service based on the profile data received from the third communication device.

According to the embodiments of the present invention described above, it is possible to provide a communication control method and a communication system that enable secure start of secondary usage of a spectrum by cooperation of a plurality of communication devices.

BRIEF DESCRIPTION OF THE DRAWINGS

FIG. 10 is a sequence chart more specifically showing a flow of smart sensing in the sequence chart of FIG. 9.

FIG. 11 is a sequence chart showing a flow of a communication control process for extending a second communication network according to an embodiment.

DETAILED DESCRIPTION OF THE EMBODIMENT(S)

Figure 1:
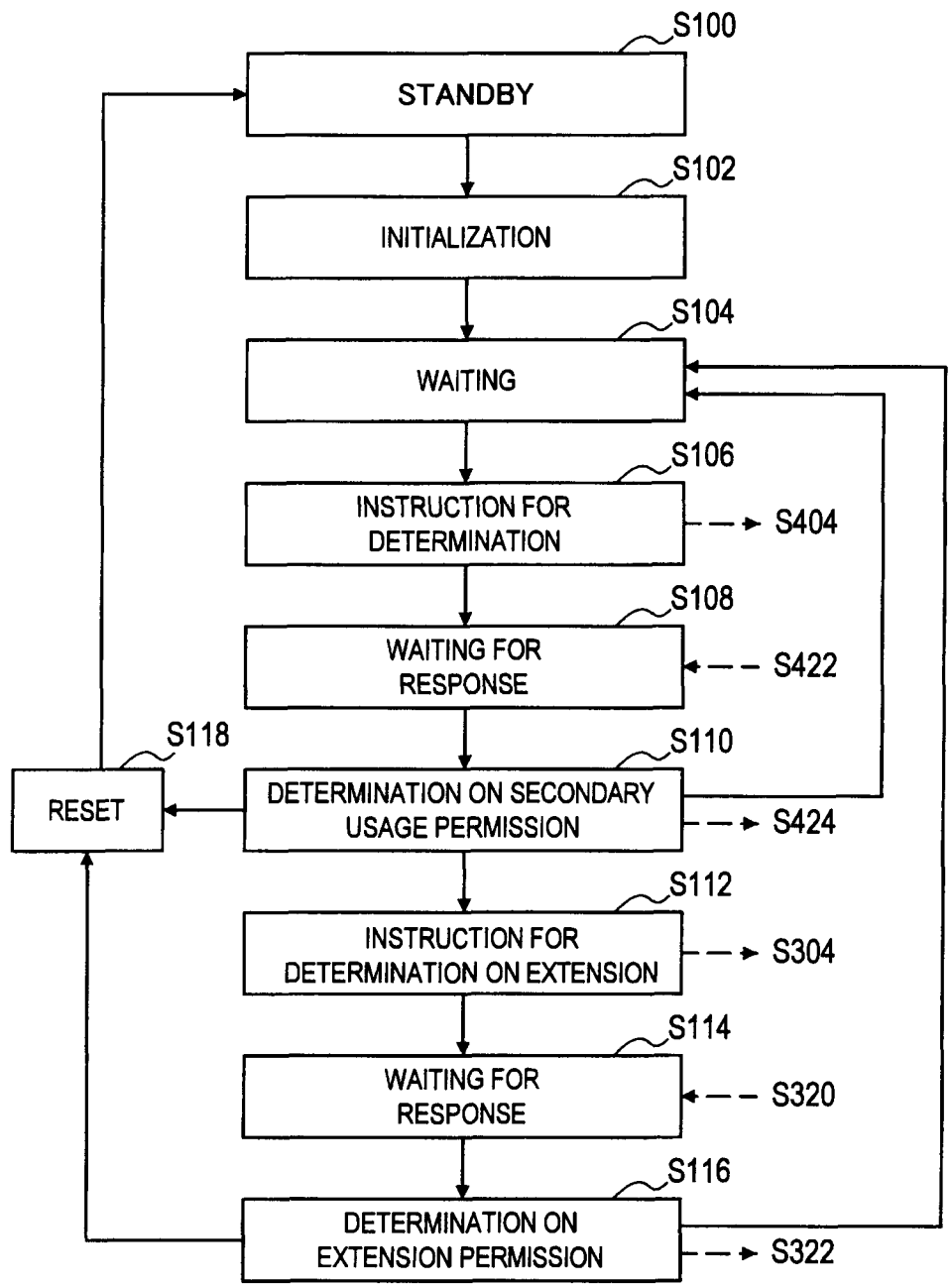
FIG. 1 is a state transition chart showing an example of state transition of a secondary communication authentication node.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Function Classification and State Transition for Secondary Usage of Spectrum
2. Exemplary Hardware Configuration of Communication Device
3. Exemplary Configuration of Communication System
4. Flow of Communication Control Process
5. Example of Data Exchanged between Nodes
6. Summary 1. Function Classification and State Transition for Secondary Usage of Spectrum Firstly, the principal functions (FC: Function Class) to be incorporated into communication devices that join a system in order to implement secondary usage of a spectrum are listed below. A communication device that joins a system incorporates one or more than one of the seven functions (FC1 to FC7) listed below.

FC1: Secondary communication authentication node
FC2: Primary communication relay node
FC3: Advanced determination node
FC4: Determination node
FC5: Smart sensor node
FC6: Sensor node
FC7: Communication node

[1-1. Secondary Communication Authentication Node (FC1)]

The secondary communication authentication node (FC1) permits start or extension of the second communication service in accordance with a specific permission condition conforming to the spectrum policy when it is determined that secondary usage of a spectrum is available by the advanced determination node or the determination node, which are described later. The secondary communication authentication node may check whether a terminal identifier, an authentication identifier, a device identifier, a sensor identifier or the like which is transmitted from the advanced determination node or the determination node is contained in a list of identifiers that have made an unauthorized use of a frequency in the past, for example. If any of the above identifiers is contained in the list of identifiers that have made an unauthorized use, for example, the secondary communication authentication node can reject start or extension of the second communication service. Further, if a base station that controls the traffic of the first communication service is the secondary communication authentication node, the base station may refer to history of user traffic or the like and grant permission for secondary usage for a time period or a place with many unoccupied channels. It is thereby possible to make some unoccupied channels open and enable effective use of a spectrum. Further, the secondary communication authentication node may generate, acquire or update information to be used for determination about the availability of secondary usage by the advanced determination node or the determination node and supply the information to the advanced determination node or the determination node. The information to be used for determination about the availability of secondary usage contains community-based or service-area-based regulatory information such as a power level usable for sensing and system information (for example, band or bandwidth currently in use) provided by neighboring base stations, for example. The secondary communication authentication node can thus serve as a so-called coordinator of the second communication service.

FIG. 1 is a state transition chart showing an example of state transition of the secondary communication authentication node. Referring to FIG. 1, the secondary communication authentication node can operate in ten states, i.e. states S100 to S118, described below.

Firstly, when the secondary communication authentication node becomes from a standby state (S100), to a state of initialization processing (S102) and further to a waiting state (S104), it waits for a request for start of secondary usage. After that, if a request for start of secondary usage is detected by a user input, an external signal from an application or the like, for example, the secondary communication authentication node gives an instruction for determination about the availability of start of secondary usage to a nearby determination node (S106). At this point, the secondary communication authentication node generates control data, which is described later, and transmits the control data together with the instruction for determination to the determination node.

Then, the secondary communication authentication node enters a state of waiting for a response from the determination node (S108). After that, if a request for permission that requests permission for start of secondary usage is received from the determination node, the secondary communication authentication node determines whether to permit start of the second communication service according to the permission condition described above (S110). The determination result is notified to the determination node from which the request for permission is transmitted, and if start of the second communication service is permitted, the second communication service is started between the determination node and a nearby communication device.

Further, if a request for extension of a network related to the second communication service (which is referred to hereinafter as a second communication network) is detected, the secondary communication authentication node gives an instruction for determination about the availability of extension of the second communication network to a nearby advanced determination node (S112). At this point, the secondary communication authentication node generates control data, which is described later, and transmits the control data together with the instruction for determination on extension to the advanced determination node. Then, the secondary communication authentication node enters a state of waiting for a response from the advanced determination node (S114). After that, if a request for extension permission that requests permission for extension of the second communication network is received from the advanced determination node, the secondary communication authentication node determines whether to permit extension of the second communication network in accordance with a specific extension permission condition (S116). The determination result is notified to the advanced determination node from which the request for extension permission is transmitted, and if extension of the second communication network is permitted, the network is extended.

Note that, if the secondary communication authentication node detects a reset signal during such a process, it can enter a state of reset processing (S118) and then return to the standby state (S100). Further, although not shown in FIG. 1, in the case where the started or extended second communication service can be cancelled (stopped) by the secondary communication authentication node, a state of the cancel processing may be further included.

There are two kinds of secondary communication authentication nodes: a permanent secondary communication authentication node and a temporary secondary communication authentication node. The permanent secondary communication authentication node is a communication device that is authorized to coordinate the second communication service because it meets a predetermined criterion set by statute or the like. On the other hand, the temporary secondary communication authentication node is a communication device that has been given an authority from the permanent secondary communication authentication node because it meets a specific criterion according to a communication environment or the like and thereby temporarily makes coordination of the second communication service within the range of the granted authority (for example, within a range of the limited frequency channels or resource blocks, or within a range of a transmission power under a specific maximum value). Herein, "coordination" of a communication service may contain, for example, allocation of resources for the communication service. The temporary secondary communication authentication node may, for example, perform collaborative resource allocation for a second communication service by exchanging scheduling information each other with the permanent secondary communication authentication node. The state transition shown in FIG. 1 can be applied to both of the permanent secondary communication authentication node and the temporary secondary communication authentication node.

[1-2. Primary Communication Relay Node (FC2)]

The primary communication relay node (FC2) serves as a pseudo base station or access point that, when connected with a communication network related to primary usage (which is referred to hereinafter as a first communication network), allows nearby nodes to use the first communication service.

[1-3. Advanced Determination Node (FC3)]

The advanced determination node (FC3) determines whether extension of a second communication network is available in accordance with a specific extension available condition conforming to the spectrum policy, based on a secondary communication profile acquired from the determination node, which is described later. The secondary communication profile typically contains sensed data (including link data statistically calculated from sensed data) obtained by sensing a communication environment. The secondary communication profile may further contain scheduling information for each of the second communication services. The secondary communication profile may further contain an identifier of the spectrum policy assigned to each determination node or the like. For example, the advanced determination node may determine that the second communication network is extendable when a criterion for starting secondary usage (a sensing level or a database) coincides with a nearby second communication network. Alternatively, the advanced determination node may determine that the second communication network is extendable when all networks satisfy the strictest sensing level. Further, the advanced determination node may determine that the second communication network is extendable when a database is accessible by using a common channel between networks. Furthermore, when communication devices to be connected with each other are included in two adjacent networks, the advanced determination node may determine the availability of extension of the second communication network with conditions that the purpose is limited to relaying or multi-hopping data between the communication devices. Furthermore, the advanced determination node may determine that an extension of a second communication network is available, when it is possible to raise the maximum transmission power without causing an adverse effect to the first communication service by utilizing a interference control technology based on beam forming or transmission power control. If the advanced determination node determines that extension of the second communication network is available, it requests the secondary communication authentication node to permit extension of the second communication network. Typically, the advanced determination node has a function of the determination node, which is described later, also. It should be noted that, when the advanced determination node and the secondary communication authentication node exist on a physically same device, a communication between the advanced determination node and the secondary communication authentication node is performed as a communication between logical functions (or it may be omitted). On the other hand, when the advanced determination node and the secondary communication authentication node exist on physically different devices, a communication between the advanced determination node and the secondary communication authentication node is performed using either wireless ling or wired link. The wireless link herein may be a wireless link based on the first communication service, for example. The wired link herein may be a link either on a private network (for example, core network) or on a public network (for example, ADSL).

Figure 2:
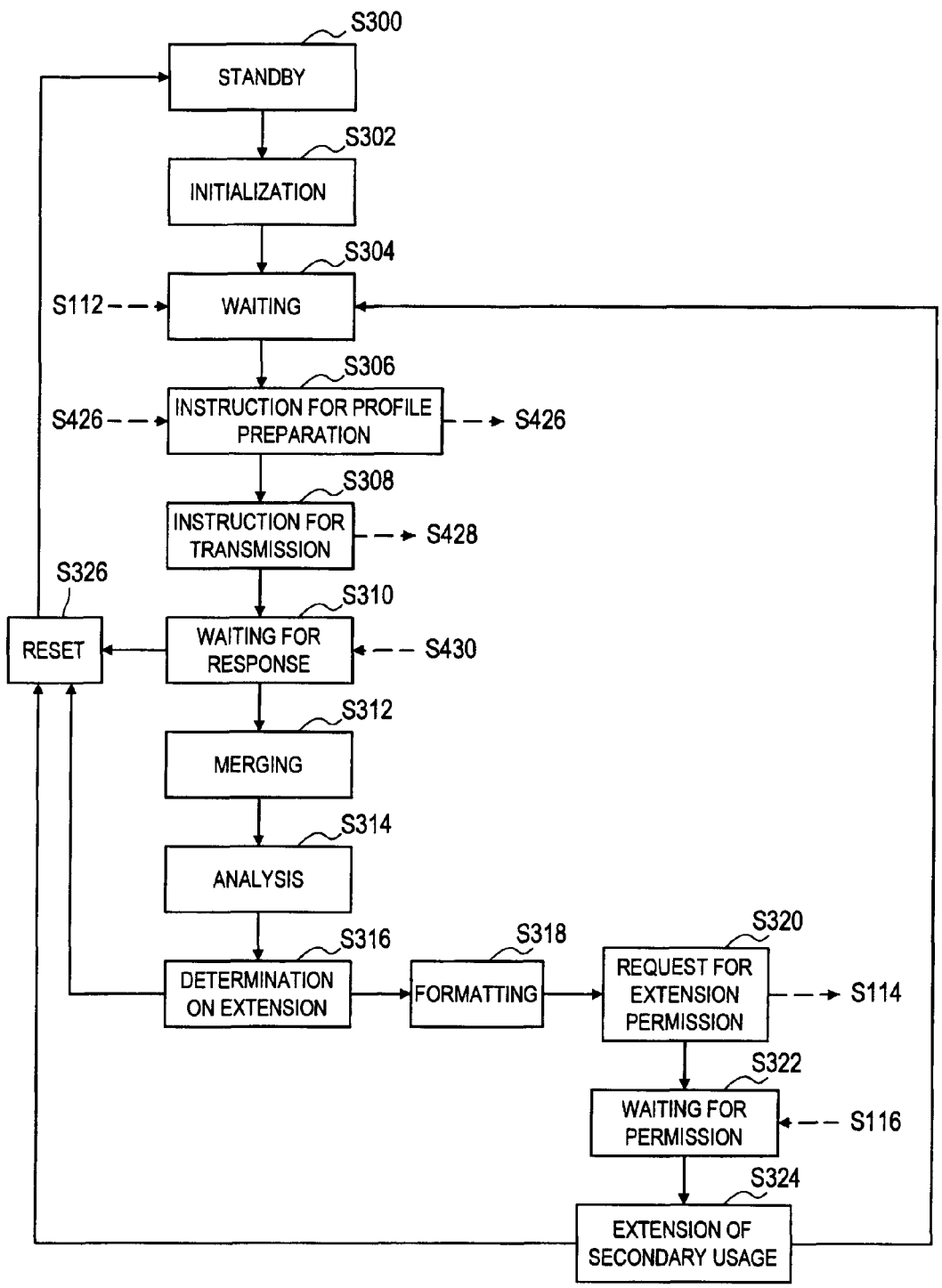
FIG. 2 is a state transition chart showing an example of state transition of an advanced determination node.

FIG. 2 is a state transition chart showing an example of state transition of the advanced determination node. Referring to FIG. 2, the advanced determination node can operate in fourteen states, i.e. states S300 to S326, described below.

First, the advanced determination node becomes from a standby state (S300), to a state of initialization processing (S302) and further to a waiting state (S304). After that, if the advanced determination node receives an instruction for determination about the availability of extension of the second communication network from the above-described secondary communication authentication node, it gives an instruction for preparation of the secondary communication profile to a nearby determination node that provides the second communication service (S306). At this point, the advanced determination node generates control data and transmits the control data together with the instruction for preparation of the secondary communication profile to the determination node. Next, the advanced determination node gives an instruction for transmission of the secondary communication profile to the determination node (S308). Then, the advanced determination node enters a state of waiting for a response from the determination node (S310). After that, if the advanced determination node receives the secondary communication profile from the determination node, it merges the secondary communication profiles received from a plurality of determination nodes, for example, into one profile (S312) and further performs statistical analysis (S314). Then, the advanced determination node determines whether extension of the second communication network is available in accordance with the above-described specific extension available condition (S316). After that, the advanced determination node transforms the determination result on the availability of extension of the second communication network into a specific format for notification to the secondary communication authentication node (S318). Then, if the advanced determination node determines that the above-described extension available condition is satisfied, it transmits a request for permission for extension of the second communication network to the secondary communication authentication node (S320), and enters a state of waiting for permission from the secondary communication authentication node (S322). If, on the other hand, the advanced determination node determines that the above-described extension available condition is not satisfied, it transmits the determination result to the secondary communication authentication node in the step S320. If extension of the second communication network is permitted by the secondary communication authentication node, the advanced determination node extends the service area of the second communication service in collaboration with the determination node from which the secondary communication profile is transmitted (S324). Note that, if the advanced determination node detects a reset signal during such a process, it can enter a state of reset processing (S326) and then return to the standby state (S300). Further, although not shown in FIG. 2, in the case where extension of the second communication network can be requested from the advanced determination node to the secondary communication authentication node, a state of the request processing may be further included.

[1-4. Determination Node (FC4)]

The determination node (FC4) determines whether secondary usage of a spectrum is available in accordance with a specific usage available condition conforming to the spectrum policy, based on sensed data sensed or acquired by the smart sensor node or the sensor node, which are described later. For example, the determination node may determine that secondary usage of a spectrum is available when a power level sensing result of a spectrum as a target of secondary usage is lower than a power sensing level defined in the above-described regulatory information. Alternatively, the determination node may determine that secondary usage of a spectrum is available when secondary usage is permitted for a spectrum as a target of secondary usage as a result of making inquiry to a data server, which is described later, for example. Further, the determination node may determine that secondary usage of a spectrum is available when a power level sensing result of a spectrum as a target of secondary usage is lower than a power sensing level indicated by data obtained from the data server described above, for example. The power level sensing result of a spectrum as a target of secondary usage may be an averaged value of A/D sampling output values, for example. If the determination node determines that secondary usage of a spectrum is available, it requests the secondary communication authentication node to permit start of the second communication service. Then, if start of the second communication service is permitted by the secondary communication authentication node, the determination node invites users of the second communication service by transmitting a beacon to nearby communication devices, for example, and starts the second communication service. Beacons transmitted by the determination node may be used by the nearby communication devices for detection, synchronization, acquisition of system information and the like regarding the second communication service. For example, primary synchronization signal and secondary synchronization signal, signals on PBCH (Physical Broadcast Channel) or the like are an example of the above-described beacons. The determination node thus serves as an engine for cognitive radio that switches from the first communication service to the second communication service. Further, the determination node generates the secondary communication profile in response to an instruction from the above-described advanced determination node and transmits the profile to the advanced determination node. It should be noted that, similarly to the above description about the advanced determination node, a communication between the determination node and the secondary communication authentication node is also performed as a communication between logical functions (In a case that they are on the same device. But the above communication processes may be omitted) or as a communication using wireless ling or wired link (In a case that they are on different devices.).

Figure 3:
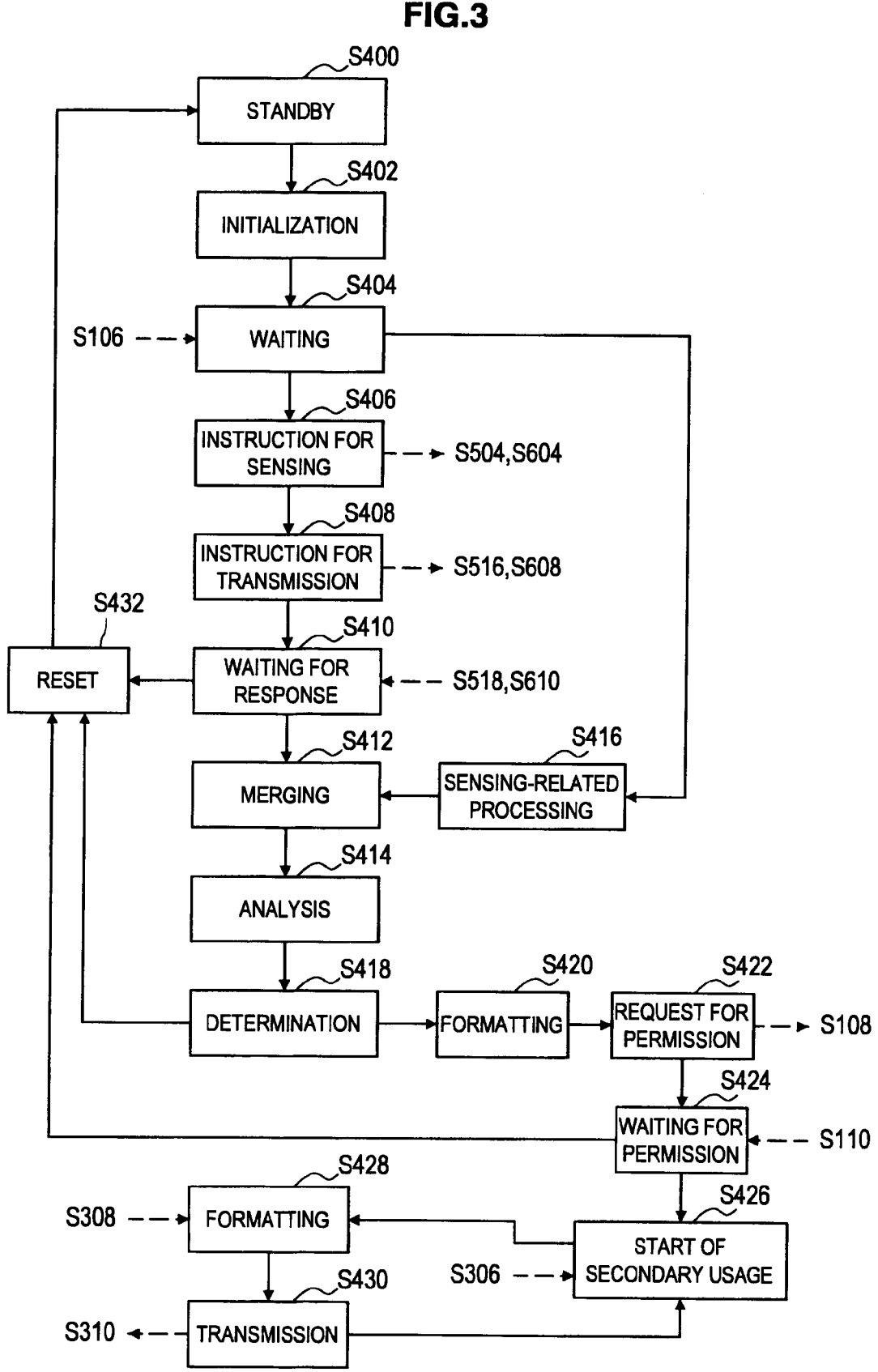
FIG. 3 is a state transition chart showing an example of state transition of a determination node.

FIG. 3 is a state transition chart showing an example of state transition of the determination node. Referring to FIG. 3, the determination node can operate in seventeen states, i.e. states S400 to S432, described below.

First, the determination node becomes from a standby state (S400), to a state of initialization processing (S402) and further to a waiting state (S404). After that, if the determination node receives an instruction for determination about the availability of start of the second communication service from the above-described secondary communication authentication node, the determination node gives an instruction for acquisition and sensing of a communication environment to a nearby smart sensor node and sensor node (S406). At this point, the determination node generates control data, which is described later, and transmits the control data together with the instruction for sensing of a communication environment to each node. Further, the determination node gives an instruction for transmission of sensed data to the smart sensor node and the sensor node which have responded to the instruction for sensing (S408). Then, the determination node enters a state of waiting for a response from the smart sensor node and the sensor node (S410). After that, if the determination node receives the sensed data of a communication environment from the smart sensor node and the sensor node, it merges the sensed data received from a plurality of nodes, for example, into one sensed data (S412), and further performs statistical analysis (S414). Further, the determination node acquires information related to a communication environment such as the above-described database inquiry result or the spectrum policy and adds the acquired information to the sensed data (S416). Then, the determination node determines whether start of the second communication service is available in accordance with the above-described specific usage available condition (S418). After that, the determination node transforms the determination result on the availability of start of the second communication service into a specific format for notification to the secondary communication authentication node (S420). Then, if the determination node determines that the above-described usage available condition is satisfied, it transmits a request for permission for start of the second communication service to the secondary communication authentication node (S422), and enters a state of waiting for permission from the secondary communication authentication node (S424). If, on the other hand, the determination node determines that the above-described usage available condition is not satisfied, it transmits the determination result to the secondary communication authentication node in the step S422. If start of the second communication service is permitted by the secondary communication authentication node, the determination node starts the second communication service with a nearby communication device (S426).

Further, if the determination node receives an instruction for preparation of the secondary communication profile from the advanced determination node in the state where the second communication service is provided, the determination node acquires information related to the secondary communication profile and transforms the information into a specific format (S428). Then, in response to an instruction for transmission from the advanced determination node, the determination node transmits the formatted secondary communication profile (S430).

Note that, if the determination node detects a reset signal during such a process, it can enter a state of reset processing (S432) and then return to the standby state (S400). Further, although not shown in FIG. 3, a state of stop processing for stopping the second communication service by the determination node may be further included, for example.

[1-5. Smart Sensor Node (FC5)]

The smart sensor node (FC5) acquires sensed data related to a communication environment stored in each node from the sensor node or the smart sensor node located in the nearby vicinity of its own device. The smart sensor node may further add sensed data sensed in its own device to the acquired sensed data (or use the sensed data sensed in its own device only). The smart sensor node thus serves as an advanced sensor capable of acquiring sensed data necessary for determination of secondary usage in collaboration with the nearby nodes. Further, the smart sensor node transmits the stored sensed data in response to an instruction from another smart sensor node or the determination node.

Figure 4:
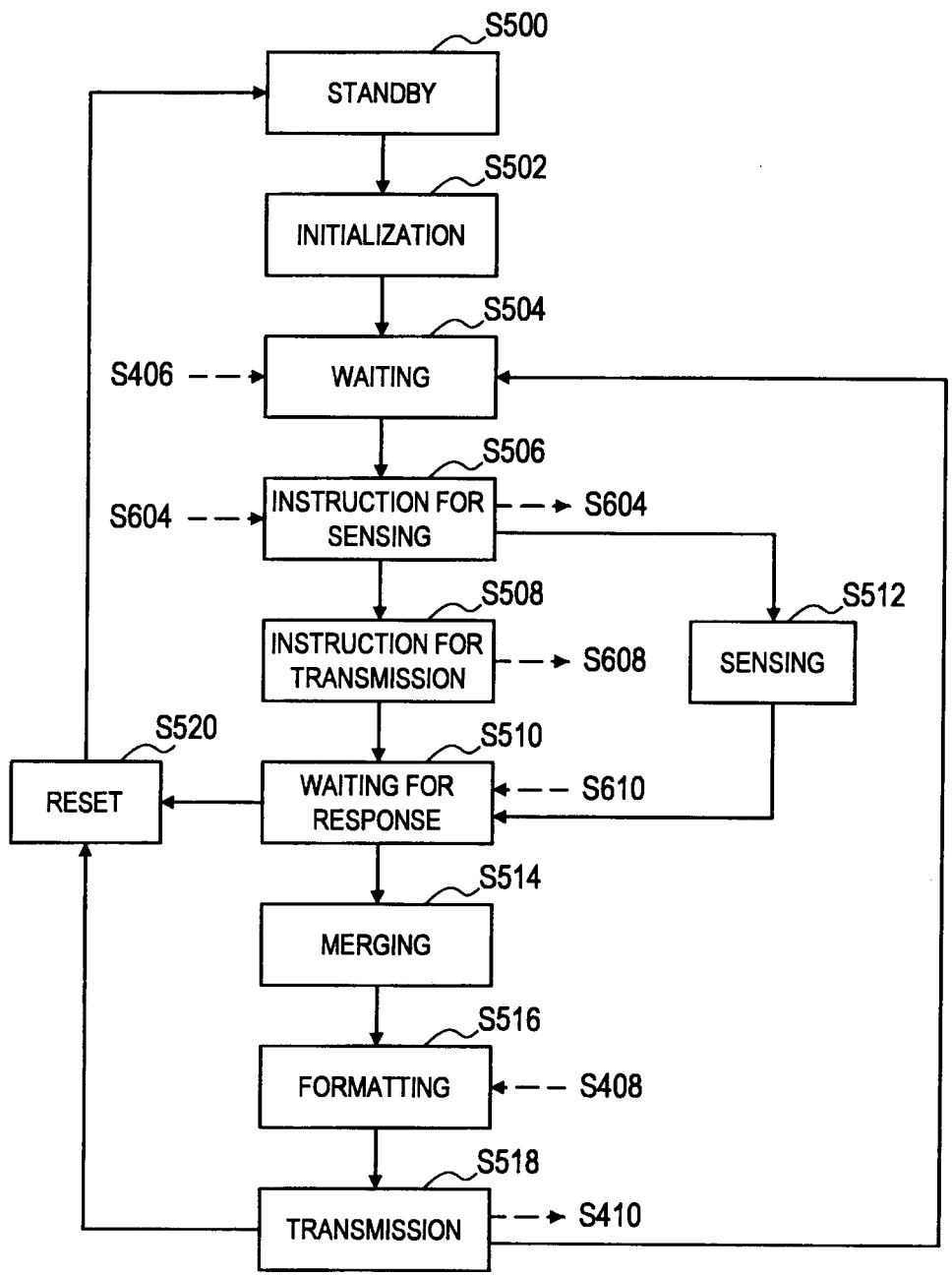
FIG. 4 is a state transition chart showing an example of state transition of a smart sensor node.

FIG. 4 is a state transition chart showing an example of state transition of the smart sensor node. Referring to FIG. 4, the smart sensor node can operate in eleven states, i.e. states S500 to S520, described below.

First, the smart sensor node becomes from a standby state (S500), to a state of initialization processing (S502) and further to a waiting state (S504). After that, if the smart sensor node receives an instruction for sensing of a communication environment and acquisition of sensed data from the above-described determination node, the smart sensor node gives an instruction for sensing of a communication environment to a nearby sensor node (S506). At this point, the smart sensor node generates control data, which is described later, and transmits the control data together with the instruction for sensing of a communication environment to the sensor node. Further, the smart sensor node gives an instruction for transmission of sensed data to the sensor node which has responded to the instruction for sensing (S508). Then, the smart sensor node enters a state of waiting for a response from the sensor node (S510). At this point, the smart sensor node may further sense a surrounding communication environment of its own when there remains surplus signal processing resource, for example (S512). After that, if the smart sensor node receives the sensed data of a communication environment from the sensor node, it merges the sensed data received from a plurality of nodes, for example, and the sensed data sensed in its own node into one sensed data (S514). After that, the smart sensor node transforms the sensed data into a specific format for notification to the determination node (S516). Then, in response to an instruction for transmission from the determination node, the smart sensor node transmits the sensed data to the determination node (S518). Note that, if the smart sensor node detects a reset signal during such a process, it can enter a state of reset processing (S520) and then return to the standby state (S500).

[1-6. Sensor Node (FC6)]

The sensor node (FC6) senses the communication environment surrounding its own device and generates sensed data. As described later in detail, the sensed data is typically data indicating the surrounding communication environment relating to the first communication service. For example, a power level or energy of received signals or scheduling information of the first communication service may be used as data indicating the surrounding communication environment. The sensor node thus serves as a sensor that generates sensed data necessary for determination of secondary usage. Further, the sensor node transmits the generated sensed data in response to an instruction from the smart sensor node or the determination node.

Figure 5:
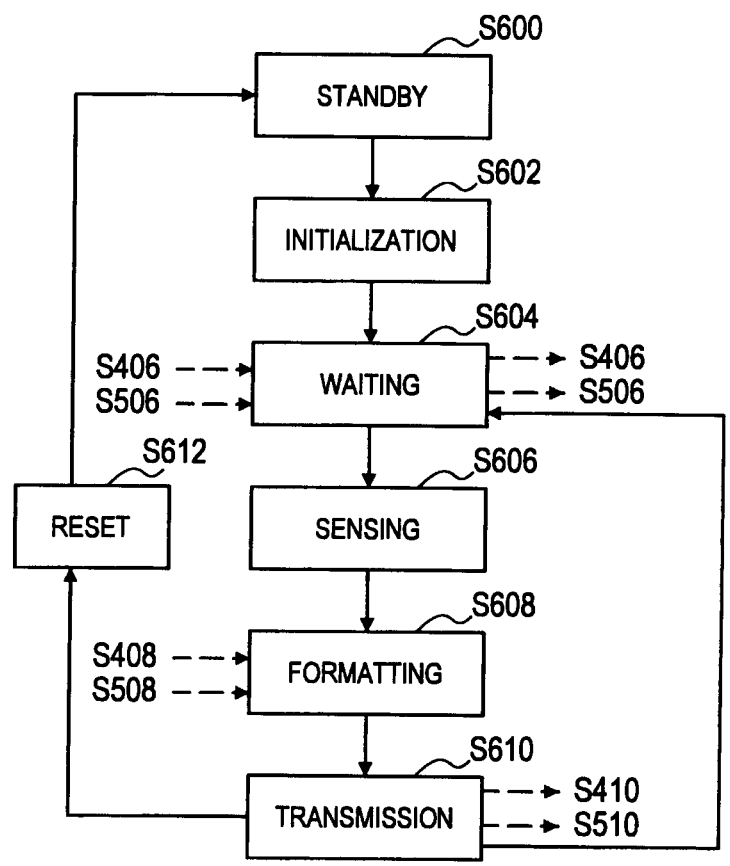
FIG. 5 is a state transition chart showing an example of state transition of a sensor node.

FIG. 5 is a state transition chart showing an example of state transition of the sensor node. Referring to FIG. 5, the sensor node can operate in seven states, i.e. states S600 to S612, described below.

First, the sensor node becomes from a standby state (S600), to a state of initialization processing (S602) and further to a waiting state (S604). After that, if the sensor node receives an instruction for sensing of a communication environment from the above-described smart sensor node, the sensor node senses a surrounding communication environment (S606). After that, the sensor node transforms the sensed data into a specific format for transmission to the smart sensor node (S608). Then, in response to an instruction for transmission from the smart sensor node, the sensor node transmits the sensed data to the smart sensor node (S610). Note that, if the sensor node detects a reset signal during such a process, it can enter a state of reset processing (S612) and then return to the standby state (S600).

[1-7. Communication Node (FC7)]

The communication node (FC7) performs communication using the second communication service when secondary usage of a spectrum is available. The communication node thus serves as a general communication device. A communication protocol used for the second communication service may be a desired communication protocol such as IEEE802.11a/b/g/n/s, Zigbee or WiMedia, for example.

As described above, the principal functions to be incorporated into communication devices that join the secondary usage system are classified into seven functions, and regarding the functions involved in the procedure of starting or extending secondary usage of a spectrum, examples of state transitions of the respective functions are shown in FIGS. 1 to 5. In each state transition, a part of the state described above may be omitted, or another state may be added. Further, the sequence of state transition may be partly changed.

[1-8. Scope of the Term "Secondary Usage"]

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

2. Exemplary Hardware Configuration of Communication Device

A hardware configuration of a communication device that incorporates one or more than one of the functions FC1 to FC7 listed in the previous section is described hereinbelow.

Figure 6:
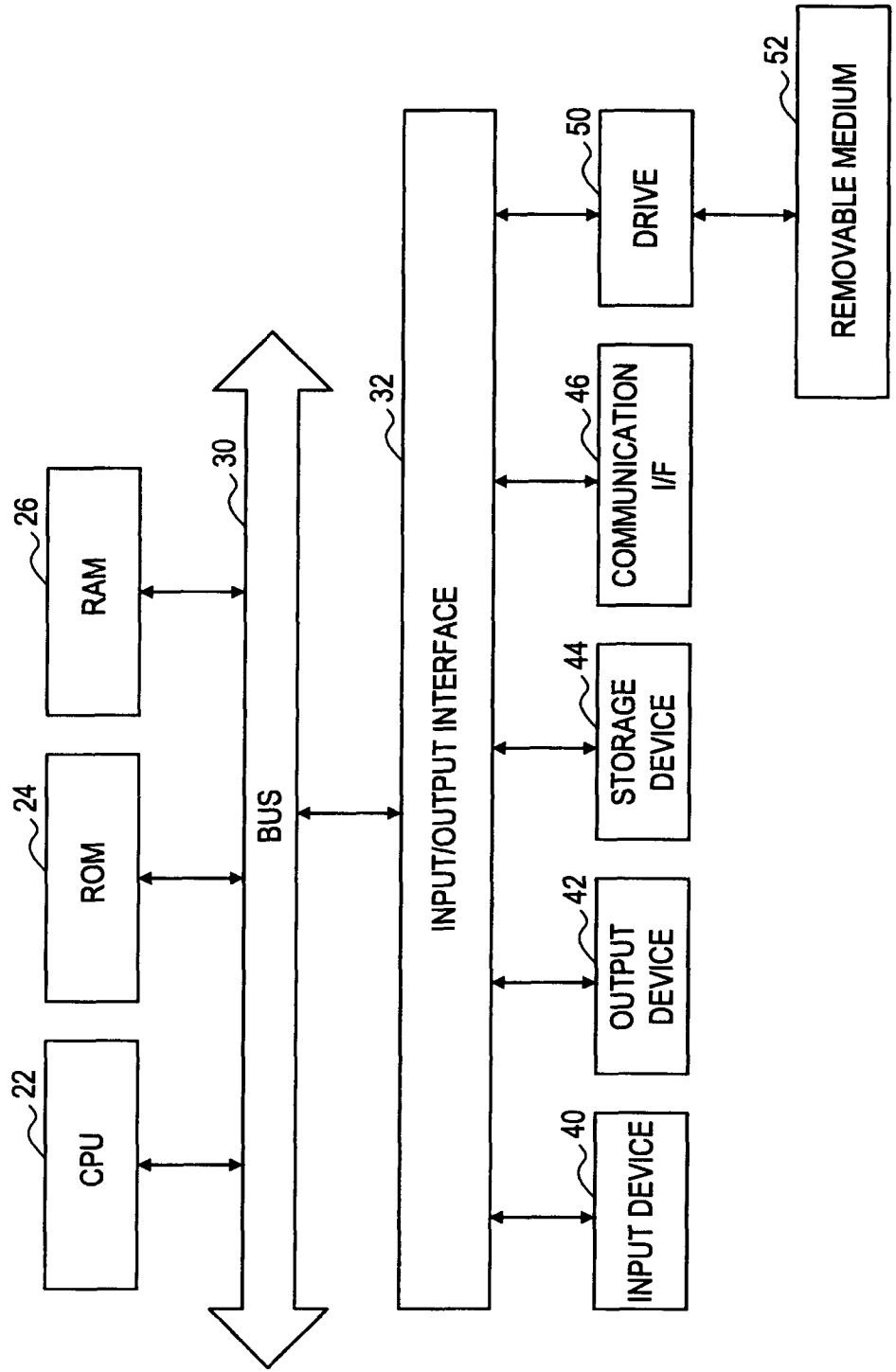
FIG. 6 is a block diagram showing an example of a hardware configuration of a communication device according to an embodiment.

FIG. 6 is a block diagram showing an example of a hardware configuration of the communication device described above. The communication device shown in FIG. 6 by way of illustration includes a central processing unit (CPU) 22, read only memory (ROM) 24, random access memory (RAM) 26, a bus 30, an input/output interface 32, an input device 40, an output device 42, a storage device 44, a communication interface (I/F) 46 and a drive 50.

In FIG. 6, the CPU 22 controls the operation of a general-purpose computer as a whole. The ROM 24 stores programs executed by the CPU 22, data and so on. The RAM 26 temporarily stores a program or data during execution of processing by the CPU 22.

The CPU 22, the ROM 24 and the RAM 26 are connected with one another through the bus 30. The input/output interface 32 is also connected to the bus 30.

The input/output interface 32 connects the CPU 22, the ROM 24 and the RAM 26 with the input device 40, the output device 42, the storage device 44, the communication interface 46 and the drive 50.

The input device 40 receives an instruction or information input from a user through a button, a switch, a lever, a mouse, a keyboard, a touch panel or the like, for example. The output device 42 outputs information to a user through a display device such as a cathode ray tube (CRT), a liquid crystal display or an organic light emitting diode (OLED), a light emitting device such as a lamp, or an audio output device such as a speaker, for example. The storage device 44 is made up of a hard disk drive or flash memory, for example, and stores programs, data and so on. The communication interface 46 mediates communication processing for the first communication service or the second communication service. A removable medium 52 is loaded to the drive 50 according to need.

Each of the functions FC1 to FC7 listed in the previous section may be implemented as software, for example. In the case where each function is implemented as software, for example, a program constituting software is stored in the ROM 24 or the storage device 44 shown in FIG. 6, loaded to the RAM 26 upon execution and executed by the CPU 22. Accordingly, the CPU 22 can serve as the secondary communication authentication unit (FC1), the primary communication relay unit (FC2), the advanced determination unit (FC3), the determination unit (FC4), the smart sensor unit (FC5), the sensor unit (FC6) or the communication unit (FC7), for example. Alternatively, each function may be implemented as hardware by using a dedicated processor which is additionally mounted to the communication device.

3. Exemplary Configuration of Communication System

An exemplary configuration of a communication system according to an embodiment of the present invention that is made up of communication devices each having one or more than one of the functions FC1 to FC7 is described hereinafter.

Figure 7:
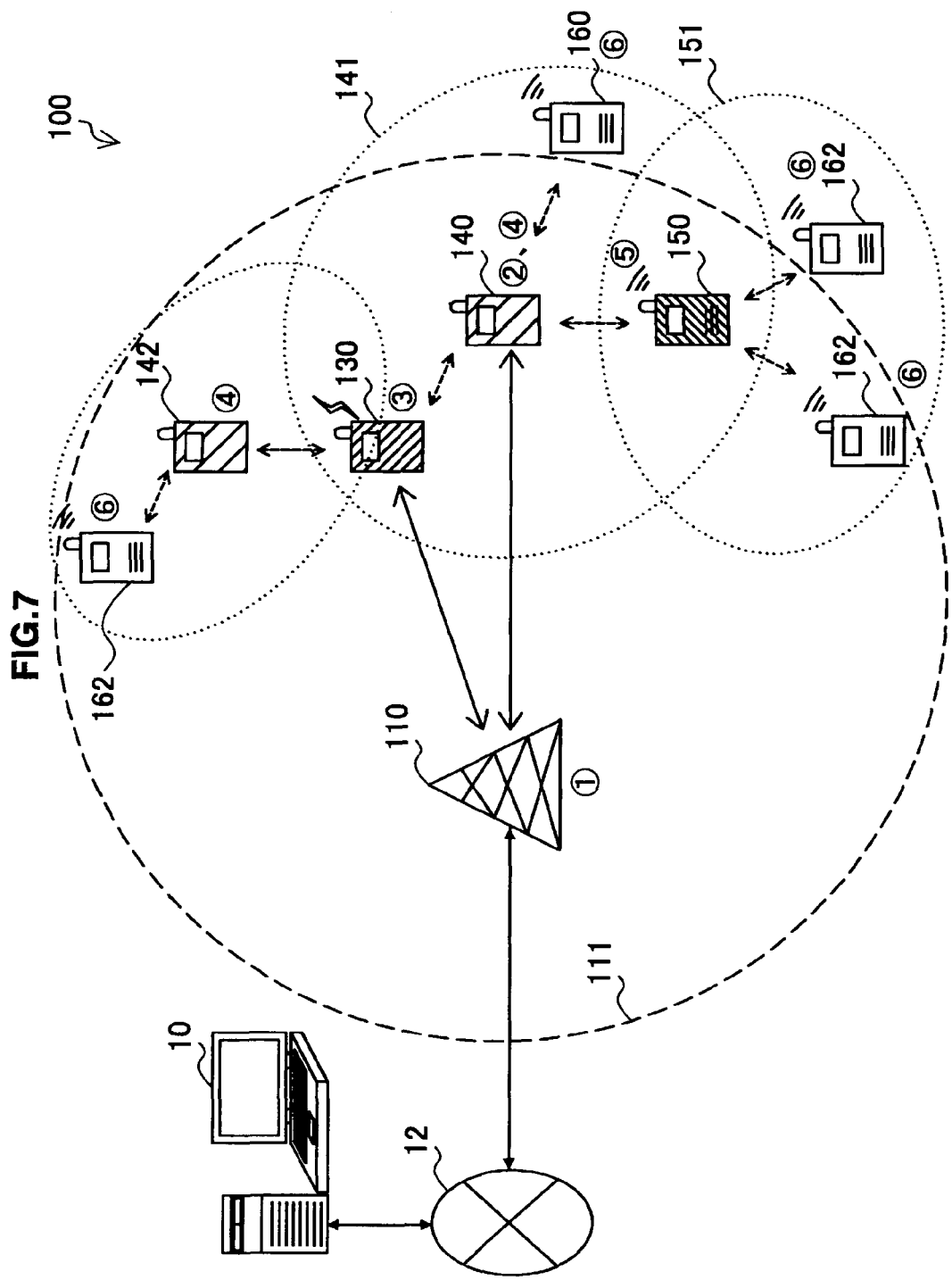
FIG. 7 is a schematic view showing an example of a configuration of a communication system according to an embodiment.
Figure 8:
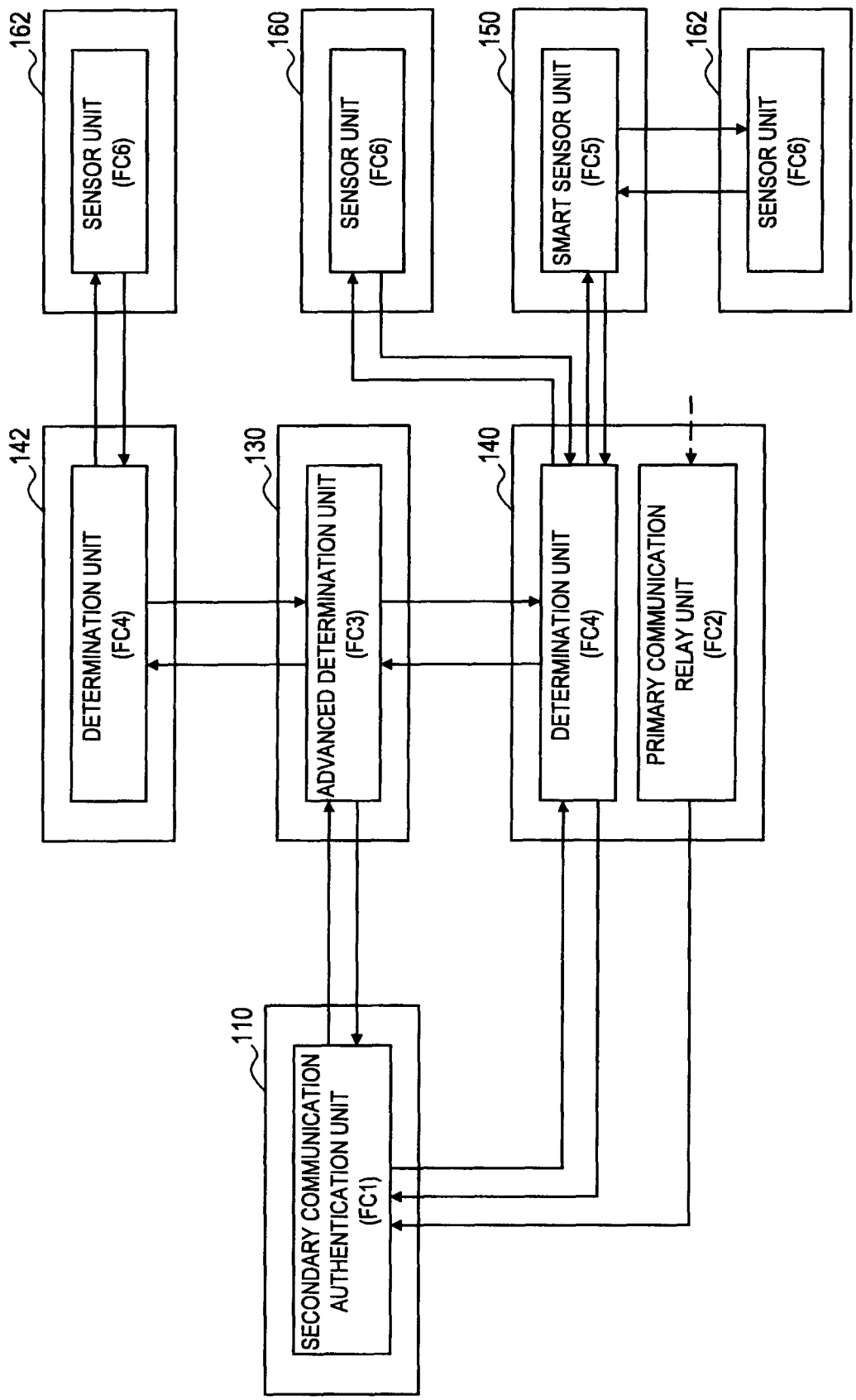
FIG. 8 is a block diagram showing an example of a functional layout in the communication system of FIG. 7.

FIG. 7 is a schematic view showing a configuration of a communication system 100 according to an embodiment of the present invention. Circled numerals in FIG. 7 correspond to the numbers of the functions (FC) described above. FIG. 8 is a block diagram showing an example of a functional layout among devices in the communication system 100 shown in FIG. 7.

Referring to FIG. 7, the communication system 100 includes a server 10, a base station 110, an advanced determination device 130, determination devices 140 and 142, a smart sensor device 150, and sensor devices 160 and 162. The base station 110 is connected to the server 10 through a network 12, which is a wired network. Further, a communication device located inside an area 111 can perform radio communication with the base station 110.

The server 10 provides the first communication service to communication devices located in the nearby vicinity of the base station 110 by using the base station 110 connected through the network 12. The first communication service may be a digital TV broadcast service, for example, or another kind of communication service. Further, the server 10 may also serve as a data server that holds data related to a communication environment of the first communication service in an integral manner. In this case, data of a frequency currently in use for each location in a communication area, use history data of a frequency for each location, predicted data related to a condition of traffic predicted from the use history data and so on are held by the server 10.

As is understood from FIG. 8, the base station 110 operates as the secondary communication authentication node (FC1) described above. Specifically, when the base station 110 receives a request for permission for usage (start or extension) of the second communication service from the determination device 140 or the advanced determination device 130, for example, the base station 110 can permit usage of the second communication service in accordance with the above-described permission condition.

The advanced determination device 130 operates as the advanced determination node (FC3) described above. Specifically, in response to an instruction from the base station 110, the advanced determination device 130 gives an instruction for transmission of the secondary communication profile to the determination devices 140 and 142. The advanced determination device 130 then determines whether extension of the second communication network is available based on the received secondary communication profile. If the advanced determination device 130 determines that extension of the second communication network is available, the advanced determination device 130 requests the base station 110 to permit extension of the second communication network. After that, if extension of the second communication network is permitted by the base station 110, the advanced determination device 130 starts provision of the second communication service with the extended network range to communication devices located in the nearby vicinity of the determination device 140 and communication devices located in the nearby vicinity of the determination device 142.

The determination device 140 operates as the primary communication relay node (FC2) and the determination node (FC4) described above. Specifically, in response to an instruction from the base station 110, the determination device 140 causes the smart sensor device 150 and the sensor device 160 located in the nearby vicinity of its own device to sense a communication environment and acquire sensed data. Then, the determination device 140 determines whether start of the second communication service is available based on the sensed data received from the smart sensor device 150 and the sensor device 160. If the determination device 140 determines that start of the second communication service is available, the determination device 140 requests the base station 110 to permit start of the second communication service. After that, if start of the second communication service is permitted by the base station 110, the determination device 140 starts provision of the second communication service to communication devices located in the nearby vicinity. Further, in response to a request from the advanced determination device 130, the determination device 140 creates a secondary communication profile containing the acquired sensed data, link data calculated from the sensed data, the spectrum policy or the like and transmit the created secondary communication profile.

Further, the determination device 140 operates as the primary communication relay node and thus serves as a pseudo base station or access point for the first communication service, and it can relay a communication packet corresponding to the first communication service which is transmitted from the sensor device 160, for example, to the base station 110.

The determination device 142 operates as the determination node (FC4) described above. Specifically, the determination device 142, like the determination device 140, can provide the second communication service according to a communication environment to communication devices located in the nearby vicinity. Further, the determination device 142 can create and transmit the secondary communication profile in response to a request from the advanced determination device 130.

The smart sensor device 150 operates as the smart sensor node (FC5) described above. Specifically, in response to an instruction from the determination device 140, the smart sensor device 150 gives an instruction for sensing of a communication environment to the sensor devices 162 in the nearby vicinity and acquires sensed data from the sensor devices 162. Further, the smart sensor device 150 may add sensed data obtained by sensing the surrounding communication environment of its own to the acquired data. The smart sensor device 150 then transmits the sensed data to the determination device 140.

The sensor devices 160 and 162 operate as the sensor node (FC6) described above. Specifically, in response to an instruction from the determination device 140 or 142 or the smart sensor device 150, the sensor devices 160 and 162 sense the communication environments surrounding their own devices and generate sensed data. The sensor devices 160 and 162 then transmit the generated sensed data to the determination device 140 or 142 or the smart sensor device 150.

In the above-described configuration of the communication system 100, the second communication service using a part or whole of the spectrum assigned to the first communication service is securely started according to the spectrum policy, for example, or its service area is securely extended. At this point, if the accuracy of the sensed data acquired inside the area 141 is low, for example, the determination device 140 may determine the availability of start of the second communication service more appropriately by using the sensed data further acquired inside the area 151 by the smart sensor device 150.

The configuration of the communication system 100 is not limited to the above-described example. For example, instead of that the base station 110 is the secondary communication authentication node, the advanced determination device 130 or the determination device 140 or 142 may be the permanent or temporary secondary communication authentication node. Further, some of the communication devices shown in FIG. 7 may be omitted, or another communication device may be added to the system.

4. Flow of Communication Control Process

A communication control process for starting or extending secondary usage of a spectrum in the above-described communication system 100 is described hereinafter more specifically with reference to FIGS. 9 to 11.

Figure 9:
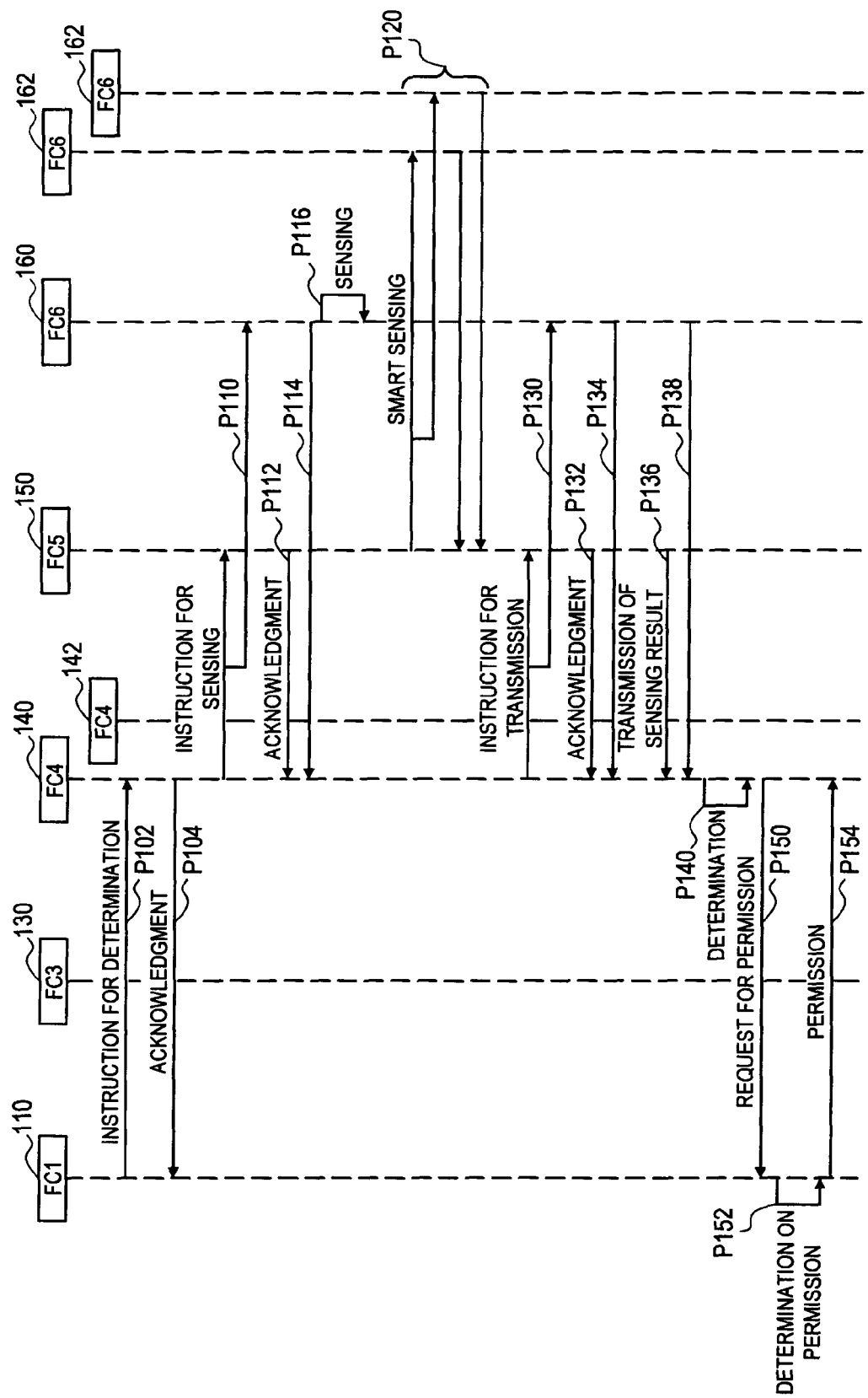
FIG. 9 is a sequence chart showing a flow of a communication control process for starting secondary usage of a spectrum according to an embodiment.

FIG. 9 is a sequence chart showing a flow of a communication control process for starting secondary usage of a spectrum according to an embodiment of the present invention.

Referring to FIG. 9, if the base station 110 detects a request for start of secondary usage of a spectrum, the base station 110 gives an instruction for determination on the availability of start of secondary usage to the determination device 140, for example (P102). Then, the determination device 140 transmits an acknowledgement to the base station 110 (P104). The acknowledgement contains information such as capability information indicating that the determination device 140 has a function as the determination node, a device identifier of the determination device 140 or location data of the determination device 140, for example. If the base station 110 receives acknowledgements from a plurality of determination devices, for example, the base station 110 may select any one device from the plurality of determination devices and instructs the selected device to make determination about the availability of start of secondary usage of a spectrum. For example, a determination device located closest to the base station 110, a determination device located closest to a user who has requested start of secondary usage of a spectrum or the like can be selected.

After that, the determination device 140 gives an instruction for sensing of a communication environment and acquisition of sensed data to the smart sensor device 150 and the sensor device 160 located in the nearby vicinity (P110). Then, the smart sensor device 150 transmits an acknowledgement to the determination device 140 (P112). Likewise, the sensor device 160 transmits an acknowledgement to the determination device 140 (P114). At this point, the acknowledgement can contain information such as capability information indicating that the smart sensor device 150 has a function as the smart sensor node and the sensor device 160 has a function as the sensor node, a device identifier or location data of each device, for example. The specific contents of the sensed data are described in further detail later.

Next, receiving the instruction for sensing from the determination device 140, the sensor device 160 senses a surrounding communication environment and generates sensed data (P116). Further, the smart sensor device 150 can execute smart sensing with the sensor devices 162 located in the nearby vicinity (P120). The smart sensor device 150 may execute smart sensing with the sensor device 162 when the smart sensor device 150 knows from the past secondary usage history data that the sensor device 162 is located in a place where an instruction for sensing from the determination device 140 cannot be received, for example. Alternatively, after the smart sensor device 150 receives an instruction for sensing from the determination device 140, the smart sensor device 150 may unconditionally transmit an instruction for sensing of a communication environment to the vicinity of its own device and then execute smart sensing in accordance with what is indicated by an acknowledge in response to the instruction.

FIG. 10 is a sequence chart showing processing (P120) related to smart sensing in the sequence chart of FIG. 9 in further detail.

Referring to FIG. 10, the smart sensor device 150 first gives an instruction for sensing of a communication environment to the sensor devices 162 located in the nearby vicinity (P202). Then, each sensor device 162 transmits an acknowledgement to the smart sensor device 150 (P204, P206). The acknowledgement may contain information such as capability information indicating that each sensor device 162 has a function as the sensor node and a device identifier and location data of each device, for example. Each sensor device 162 then senses a communication environment surrounding its own device and generates sensed data (P208). Next, the smart sensor device 150 gives an instruction for transmission of the sensed data of a communication environment to each sensor device 162 (P210). Then, each sensor device 162 transmits an acknowledgment to the smart sensor device 150 (P212, P214). Each sensor device 162 then transmits a sensing result, which is formatted sensed data, to the smart sensor device 150 (P216, P218). After that, the smart sensor device 150 merges the sensed data received from the respective sensor devices 162 (and the sensed data sensed in its own device according to need) (P220). Smart sensing between the smart sensor device 150 and the sensor devices 162 thereby ends. Note that, if an acknowledgement is not received from any sensor device after P202, for example, the smart sensor device 150 may use only the sensed data sensed in its own device as a sensing result.

Referring back to FIG. 9, the flow of the communication control process according to an embodiment of the present invention is further described hereinbelow.

After that, the determination device 140 gives an instruction for transmission of sensed or acquired sensed data to the smart sensor device 150 and the sensor device 160 (P130). Then, the smart sensor device 150 transmits an acknowledgement to the determination device 140 (P132). Likewise, the sensor device 160 transmits an acknowledgement to the determination device 140 (P134). At this point, the acknowledgement can contain information such as the above-described capability information, a device identifier or location data of each device, for example. After that, the smart sensor device 150 transmits the sensed data acquired by smart sensing to the determination device 140 (P136). Further, the sensor device 160 transmits the sensed data sensed by itself to the determination device 140 (P138). In P130, the determination device 140 may give an instruction for merging of the sensed data acquired or sensed by the smart sensor device 150 and the sensor device 160 to any device selected from the smart sensor device 150 and the sensor device 160, for example.

Next, the determination device 140 makes determination on the availability of start of the second communication service that uses a part or whole of the spectrum assigned to the first communication service in accordance with the above-described usage available condition based on the sensed data received from the smart sensor device 150 and the sensor device 160 (P140). Then, the determination device 140 transmits a result of the determination to the base station 110. If the determination device 140 determines that start of the second communication service is available, for example, the determination device 140 requests the base station 110 to permit start of the second communication service (P150).

Next, the base station 110 determines whether to permit start of the second communication service in accordance with the above-described permission condition based on the determination result received from the determination device 140 (P152). Then, the base station 110 transmits a result of the determination to the determination device 140 (P154). If start of the second communication service is permitted by the base station 110, the determination device 140 starts provision of the second communication service to communication devices located in the nearby vicinity.

By the communication control process described above, the second communication service is securely started according to the spectrum policy without causing an adverse effect such as degradation of communication quality on the first communication service. After the second communication service is started, if a request for extension of the second communication network is detected, the second communication network can be extended by the communication control process which is further described below. A request for extension of the second communication network can be output from a device that desires communication with a device currently not connected to the second communication network, for example, to the base station 110, the advanced determination device 130 or the like. The information such as capability information, a device identifier and location data which are described with respect to FIG. 9 and FIG. 10 may be transmitted or received in a separate step from acknowledgement step. Furthermore, acknowledgement may be transmitted in response to a reception of such information, and negative acknowledgement may be transmitted instead of acknowledgement in response to a request for information or instruction.

FIG. 11 is a sequence chart showing a flow of a communication control process for extending the second communication network according to an embodiment of the present invention.

Referring to FIG. 11, if the base station 110 detects a request for extension of the second communication network, the base station 110 gives an instruction for determination on the availability of extension of the second communication network to the advanced determination device 130, for example (P302). Then, the advanced determination device 130 transmits an acknowledgement to the base station 110 (P304). The acknowledgement can contain information such as capability information indicating that the advanced determination device 130 has a function as the advanced determination node, a device identifier of the advanced determination device 130 or location data of the advanced determination device 130, for example. If the base station 110 receives acknowledgements from a plurality of advanced determination devices, for example, the base station 110 may select any one device from the plurality of advanced determination devices and instructs the selected device to make determination about the availability of extension of the second communication network. For example, an advanced determination node located closest to the base station 110, an advanced determination node located closest to a device of a party with which communication is desired or the like can be selected. Alternatively, determination on the availability of extension of the second communication network may be performed by a plurality of advanced determination devices in collaboration with one another, for example.

Next, the advanced determination device 130 gives an instruction for preparation of the above-described secondary communication profile to the determination devices 140 and 142 located in the nearby vicinity (P310). Then, the determination device 140 transmits an acknowledgement to the advanced determination device 130 (P312). Likewise, the determination device 142 transmits an acknowledgement to the advanced determination device 130 (P314).

Then, the advanced determination device 130 gives an instruction for transmission of the secondary communication profile to the determination devices 140 and 142 (P316). Then, the determination device 140 transmits an acknowledgement to the advanced determination device 130 (P318). Likewise, the determination device 142 transmits an acknowledgement to the advanced determination device 130 (P320). After that, the determination device 140 transmits the formatted secondary communication profile to the advanced determination device 130 (P322). Likewise, the determination device 142 transmits the formatted secondary communication profile to the advanced determination device 130 (P324).

The advanced determination device 130 then determines the availability of extension of the second communication network in accordance with the above-described extension available condition based on the secondary communication profiles received from the determination devices 140 and 142 (P330). Then, the advanced determination device 130 transmits a result of the determination to the base station 110. If the advanced determination device 130 determines that extension of the second communication network is available, for example, the advanced determination device 130 requests the base station 110 to permit extension of the second communication network (P340).

Then, the base station 110 determines whether to permit extension of the second communication network in accordance with the above-described permission condition based on the determination result received from the advanced determination device 130 (P342). The base station 110 then transmits a result of the determination to the advanced determination device 130 (P344). If extension of the second communication network is permitted by the base station 110, for example, the advanced determination device 130 and the determination devices 140 and 142, for example, start provision of the second communication service with the extended service area to communication devices located in the nearby vicinity.

By the communication control process described above, the service area of the second communication service is securely extended according to the spectrum policy without causing an adverse effect such as degradation of communication quality on the first communication service.

5. Example of Data Exchanged between Nodes

In the communication control process according to the embodiment described above, the data transmitted and received between nodes largely involves two kinds of data: sensed data and control data.

[5-1. Sensed Data]

The sensed data is data that is related to the communication environment sensed by the sensor node or the smart sensor node described above. The target communication resources of sensing by the sensor node or the smart sensor node are communication resources, which there is a possibility that they are used by the first communication service, and represented by frequency channels, resource blocks, codes or the like. Which range of the communication resources should be sensed is, for example, determined by monitoring the downlink broadcast channel of the first communication service (such as PBCH of LTE or the like). The sensed data may contain an identifier of a device which has sensed a communication environment and a sensing result, and may further contain location data of a device acquired using a global positioning system (GPS), a kind of a sensing algorithm, a time stamp or the like. Further, an analysis result obtained by analyzing the sensed data, scheduling information indicating surrounding communication environment regarding the first communication service and the like can be contained in the sensed data in a broad sense.

The location data of a device is data indicating the location of a device which has sensed a communication environment at the time of sensing, for example. The location data is used for determination about the availability of secondary usage of a spectrum by the determination node (or the advanced determination node), for example. Specifically, the determination node downloads a location information database which is prepared externally (e.g. in the server 10 etc.) in advance to its own device, for example. The location information database contains channel assignment of the first communication service, channel usage history or the like in association with the location data. Thus, the determination node can retrieve channel assignment or channel usage history from the location information database by using the location data as a key, for example, and thereby evaluate the possibility that the secondary usage causes an adverse effect on the first communication service. Instead of downloading the location information database to its own device in advance, the determination node may make inquiry to an external database by using the location data as a key at the time of determining the availability of secondary usage, for example.

The kind of a sensing algorithm indicates what kind of value is to be sensed (or have been sensed), such as radio signal energy, a noise power level, a noise ratio (e.g. SNR or CNR) or an error rate (e.g. BER or PER), for example.

The sensing result contains the value of the sensing result according to the kind of a sensing algorithm described above. The value of the sensing result may be represented by soft bit (soft decision value) or hard bit (hard decision value). For example, it is preferred that the determination node (or the advanced determination node) represents the sensing result to be transmitted to the secondary communication authentication node by hard bit. In this case, a result of determining the availability of secondary usage or the like according to the sensed value is represented by a logical value such as "0" or "1". This enables a decrease in traffic between nodes. On the other hand, the sensing result to be transmitted from the sensor node (or the smart sensor node) to the determination node (or the advanced determination node) is typically represented by soft bit.

The time stamp contains time when sensing of a communication environment is started, time when sensing of a communication environment ends or the like, for example.

[5-2. Control Data]

The control data is data that is used in order that one node of the above-described nodes constituting the secondary usage system controls another node or one node receives control from another node. The control data can contain an instruction for start or stop of sensing, an instruction for transmission of sensed data, designation of the kind of a sensing algorithm, an instruction for transmission of the secondary communication profile, an access request to the location information database or the like, for example.

In the case where the advanced determination node, the determination node or the smart sensor node merges the sensed data acquired from a plurality of nodes, information indicating by what method the sensed data is merged, such as averaging or standard deviation, can be contained in the control data.

Further, the secondary communication authentication node, the advanced determination node or the determination node may evaluate the reliability of each sensed data by comparing the sensed data sensed or acquired by one node with the sensed data sensed or acquired by another node. For example, if sensing results sensed or acquired by a plurality of nodes located in close proximity vary widely, the reliability of the sensed data can be evaluated to be low. In such a case, the evaluation result of the reliability of the sensed data is contained in the control data. Further, a node in the state of a hidden terminal may be detected by comparing the sensed data sensed or acquired by one node with the sensed data sensed or acquired by another node.

Further, the smart sensor node may exchange the control data such as upper limits of the allowable number of hops and the allowable number of sensor nodes and the minimum required number of sensor nodes with another smart sensor node. It is thereby possible to extend the sensing area of smart sensing as well as maintaining a certain quality of the sensed data.

[5-3. Selection of Communication Protocol]

In transmission and reception of the sensed data or the control data, it is preferred to use a hierarchical management communication protocol according to control of a higher-order node between nodes at different levels in the function classifications FC1 to FC7. The hierarchical management communication protocol is Zigbee or the like, for example. When transmitting an instruction for sensing of a communication environment from the determination device to the smart sensor device, for example, the hierarchical management communication protocol such as Zigbee can be used according to control of the determination device, which is a higher-order node. In the case of using the hierarchical management communication protocol, when transmitting or receiving a packet, data exchange is performed between transmitting and receiving devices with use of a previously reserved transmitting and receiving bandwidth which is managed by a coordinator (a coordinator of secondary usage, which is different from the secondary communication authentication node). In the above-described Zigbee, for example, a time slot which is a contention free period and a time slot which is a contention access period are defined based on a beacon managed by the coordinator as a reference. Between devices that perform communication with use of the time slot in the contention access period, the opportunity of transmission is coordinated by its own judgment so as to avoid conflict with a transmission packet from another device. In this case, in order to know the timing without conflict, it is necessary for each device to receive a reference beacon transmitted from the coordinator, so that they conform to the hierarchical management communication protocol as a result.

On the other hand, in the case of transmitting or receiving sensed data between the smart sensor nodes, for example, an autonomous distributed communication protocol such as IEEE802.11s or WiMedia may be used. Because a coordinator does not exist for transmission or reception of a packet in the autonomous distributed communication protocol, the opportunity of transmission is coordinated by judgment of each device so as to avoid collision with a transmission packet from another device, and then data exchange is performed between transmitting and receiving devices. Alternatively, the hierarchical management communication protocol such as Zigbee may be used according to control of a device which has transmitted a beacon first. If the autonomous distributed communication protocol is used between nodes at the same level in the above-described function classifications FC1 to FC7, it is possible to easily change the topology between devices performing smart sensing in accordance with the location of devices.

6. Summary

The communication control process according to an embodiment of the present invention is described above with reference to FIGS. 1 to 11. According to the embodiment, the principal functions to be incorporated into communication devices that join the secondary usage system are classified into seven functions of FC1 to FC7. By dividing the secondary communication authentication node from the determination node, for example, if a device having authority for permitting secondary usage is located in a place different from an area where a secondary usage service is desired to be provided, it is possible to authorize the determination node located in the service provision area to perform determination on the availability of secondary usage. Further, by dividing the determination node from the smart sensor node, for example, if the determination node fails to acquire the sensed data with sufficient accuracy or amount for determination on the availability of secondary usage by itself, it is possible to acquire the sensed data over a wider range with use of the smart sensor node. Further, by dividing the advanced determination node from the determination node, for example, it is possible that the advanced determination node determines whether the second communication network can be securely extended based on the secondary communication profiles created by a plurality of determination nodes.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hotzone, relay node, femto-cell and the like may form a mode of secondary usage of spectrum (such as heterogeneous network).

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-026276 filed in the Japan Patent Office on Feb. 6, 2009, the entire content of which is hereby incorporated by reference.

What is claimed is:

1. A communication control method comprising the steps of:
providing an instruction for determining availability of usage of a second communication service using a part or whole of a spectrum assigned to a first communication service from a first communication device to a second communication device;
providing an instruction, for sensing a communication environment, from the second communication device to a third communication device located nearby the second communication device, wherein the third communication device is separate and located apart from the second communication device;
transmitting sensed data, obtained by sensing the communication environment, from the third communication device to the second communication device;
determining availability of usage of the second communication service based on the sensed data by the second communication device;
transmitting a determination result on availability of usage of the second communication service from the second communication device to the first communication device; and
permitting usage of the second communication service in accordance with the determination result received from the second communication device by the first communication device.

2. The communication control method according to claim 1, further comprising the step of:
transmitting, after receiving the instruction for sensing a communication environment, a sensing instruction for sensing a communication environment from the third communication device to a sensing communication device located nearby.

3. The communication control method according to claim 2, further comprising the step of:
upon receiving a request for extension of a network related to the second communication service after usage of the second communication service is permitted, providing an instruction for determining availability of extension of the network related to the second communication service from the first communication device to a fourth communication device.

4. The communication control method according to claim 3, further comprising the steps of:
providing an instruction for transmitting profile data related to the second communication service from the fourth communication device to the second communication device; and
transmitting the profile data from the second communication device to the fourth communication device.

5. The communication control method according to claim 4, further comprising the step of:
determining availability of extension of the network related to the second communication service based on the profile data by the fourth communication device.

6. The communication control method according to claim 5, further comprising the step of:
transmitting a determination result on availability of extension of the network related to the second communication service from the fourth communication device to the first communication device.

7. The communication control method according to claim 6, further comprising the step of:
permitting extension of the network related to the second communication service in accordance with the determination result received from the fourth communication device by the first communication device.

8. The communication control method according to claim 1, further comprising the step of:
if a plurality of communication devices capable of sensing a communication environment exists near the second communication device, merging sensed data sensed by the plurality of communication devices by the third communication device being one of the plurality of communication devices.

9. The communication control method according to claim 1, further comprising the step of:
if a plurality of communication devices capable of determining availability of usage of the second communication service exists, selecting a device to make determination on availability of usage of the second communication service from the plurality of communication devices by the first communication device.

10. The communication control method according to claim 1, wherein the second communication device and the third communication device are separate devices, and the third communication device is located at a place different than an area where the second communication device is provided.

11. The communication control method according to claim 1, wherein a control data is provided from the second communication device to the third communication device, the control data comprising the instruction that instructs the third communication device to perform the sensing of the communication environment and an instruction that instructs the third communication device to perform the transmitting the sensed data to send the sensed data back to the second communication device.

12. The communication control method according to claim 1, wherein the communication environment is indicated by data comprising at least one of a spectrum policy usage information, a power level of received signals, an energy level of received signals, scheduling information of the first communication service, a list of frequencies currently in use in a communication area, a use history data of used frequencies, and predicted data related to a condition of traffic predicted form the use history data.

13. A communication control method comprising the steps of:
upon receiving a request for extension of a network related to a second communication service using a part or whole of a spectrum assigned to a first communication service, providing an instruction for determining availability of extension of the network from a first communication device to a second communication device;
providing an instruction, for transmitting profile data related to the second communication service, from the second communication device to a third communication device providing the second communication service, wherein the third communication device is separate and located apart from the second communication device;
transmitting the profile data from the third communication device to the second communication device;
determining availability of extension of the network related to the second communication service based on the profile data by the second communication device;
transmitting a determination result on availability of extension of the network related to the second communication service from the second communication device to the first communication device; and
permitting extension of the network related to the second communication service in accordance with the determination result received from the second communication device by the first communication device.

14. A communication system comprising:
a first communication device including an authentication unit having authority to permit usage of a second communication service using a part or whole of a spectrum assigned to a first communication service;
a second communication device including a determination unit capable of determining availability of usage of the second communication service; and
a third communication device including a sensing unit capable of sensing a surrounding communication environment, the third communication device being separate and located apart from the second communication device, wherein
the authentication unit provides an instruction for determining availability of usage of the second communication service to the second communication device and permits usage of the second communication service in accordance with a determination result on availability of usage of the second communication service, the determination result being received from the second communication device, and
the determination unit provides an instruction for sensing the surrounding communication environment to the third communication device and determines availability of usage of the second communication service based on sensed data obtained by sensing the surrounding communication environment, the sensed data being received from the third communication device.

15. A communication system comprising:
a first communication device including an authentication unit having authority to permit extension of a network related to a second communication service using a part or whole of a spectrum assigned to a first communication service;
a second communication device including an advanced determination unit capable of determining availability of extension of the network related to the second communication service; and
a third communication device including a determination unit capable of determining availability of usage of the second communication service, the third communication device being separate and located apart from the second communication device, wherein the authentication unit provides an instruction for determining availability of extension of the network related to the second communication service to the second communication device and permits extension of the network in accordance with a determination result on availability of extension of the network, the determination result being received from the second communication device, and the advanced determination unit provides an instruction for transmitting profile data related to the second communication service to the third communication device and determines availability of extension of the network related to the second communication service based on the profile data received from the third communication device.

* * * * *